(12) United States Patent
Shinaar et al.

(10) Patent No.: US 9,690,518 B2
(45) Date of Patent: Jun. 27, 2017

(54) DYNAMIC HOST COMMAND REJECTION

(71) Applicant: SANDISK TECHNOLOGIES INC., Plano, TX (US)

(72) Inventors: Ofer Shinaar, Karmial (IL); Nati Rapaport, Ma'alot (IL); Efraim Dalumi, Misgav (IL); Eran Arad, Misgav (IL); Yiftach Tzori, Michmanim (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 37 days.

(21) Appl. No.: 14/484,106

(22) Filed: Sep. 11, 2014

(65) Prior Publication Data

US 2016/0062657 A1     Mar. 3, 2016

Related U.S. Application Data

(60) Provisional application No. 62/043,553, filed on Aug. 29, 2014.

(51) Int. Cl.
*G06F 3/06* (2006.01)

(52) U.S. Cl.
CPC .......... *G06F 3/0679* (2013.01); *G06F 3/0607* (2013.01); *G06F 3/0659* (2013.01)

(58) Field of Classification Search
CPC ..... G06F 3/0607; G06F 3/0659; G06F 3/0679
See application file for complete search history.

(56) References Cited

U.S. PATENT DOCUMENTS

| | | | | |
|---|---|---|---|---|
| 5,671,179 A | * | 9/1997 | Javanifard | G11C 16/30 365/185.33 |
| 6,631,453 B1 | * | 10/2003 | Friday | G06F 3/0623 213/200 |
| 7,167,958 B2 | * | 1/2007 | Hashimoto | G06F 21/80 711/114 |
| 2006/0083069 A1 | * | 4/2006 | Fasoli | G11C 5/04 365/185.19 |
| 2007/0088931 A1 | * | 4/2007 | Osaki | G06F 21/6227 711/173 |
| 2009/0006795 A1 | * | 1/2009 | Bress | G06F 12/1416 711/163 |
| 2011/0072185 A1 | | 3/2011 | Pinto et al. | |
| 2013/0060980 A1 | | 3/2013 | Zitlaw | |
| 2013/0060981 A1 | | 3/2013 | Horn et al. | |

OTHER PUBLICATIONS

"Universal Flash Storage (UFS)," JESD220B (Revision of JESD220A, Jun. 2012), Version 2.0, Sep. 2013, JEDEC Standard, JEDEC Solid State Technology Association, 366 pages.

* cited by examiner

*Primary Examiner* — Aracelis Ruiz
(74) *Attorney, Agent, or Firm* — Toler Law Group, PC

(57) ABSTRACT

A data storage device includes a non-volatile memory and host interface circuitry. The host interface circuitry is configured, in response to receiving a first command from a host device, to access a table to determine whether to reject the first command based on an operating state of the data storage device. The data storage device also includes a processor coupled to the non-volatile memory and to the host interface circuitry. The processor is configured to program the table.

25 Claims, 4 Drawing Sheets

DYNAMIC HOST COMMAND REJECTION

CROSS-REFERENCE TO RELATED APPLICATIONS

The present application claims priority to U.S. Provisional Application No. 62/043,553, filed Aug. 29, 2014, which application is hereby incorporated by reference herein in its entirety.

FIELD OF THE DISCLOSURE

The present disclosure is generally related to rejecting host commands based on a condition of a receiving data storage device.

BACKGROUND

Non-volatile data storage devices, such as universal serial bus (USB) flash memory devices or removable storage cards, have allowed for increased portability of data and software applications. Some communication protocols allow a data storage device to receive multiple commands from a host device and require the data storage device to reject commands from the host device under certain conditions. As example is a universal flash storage (UFS)-type protocol, such as described in Joint Electron Device Engineering Council (JEDEC) standard JESD220B, "Universal Flash Storage (UFS), Version 2.0," published September 2013.

Data storage device compliance with rules and restrictions regarding whether to accept or reject commands may be difficult due to a variety of possible operating conditions of the data storage device. As an example, because protocols may be revised or updated over the life of the data storage device, the data storage device should be able to update the accept/reject decision processing to maintain compliance with updated versions of the protocol and therefore to improve the usefulness of the data storage device. In addition, because a host device may send a large number of commands to the data storage device in rapid succession, the data storage device should have sufficient computational speed to prevent accept/reject decision processing from impacting device performance.

SUMMARY

A data storage device includes host interface circuitry that accesses one or more tables to determine whether to accept or reject commands received from a host device (e.g., based on protocol rules). The tables are initialized by a processor of the data storage device and one or more of the tables may be dynamically updated by the processor to enable updating of conditions that underlie command accept/reject decisions. Decision processing by host interface circuitry provides high-speed operation to handle a high rate of commands received from the host device, and initializing and/or dynamically updating one or more of the tables by the processor provides flexibility to update accept/reject decision criteria.

DETAILED DESCRIPTION

Figure 1:
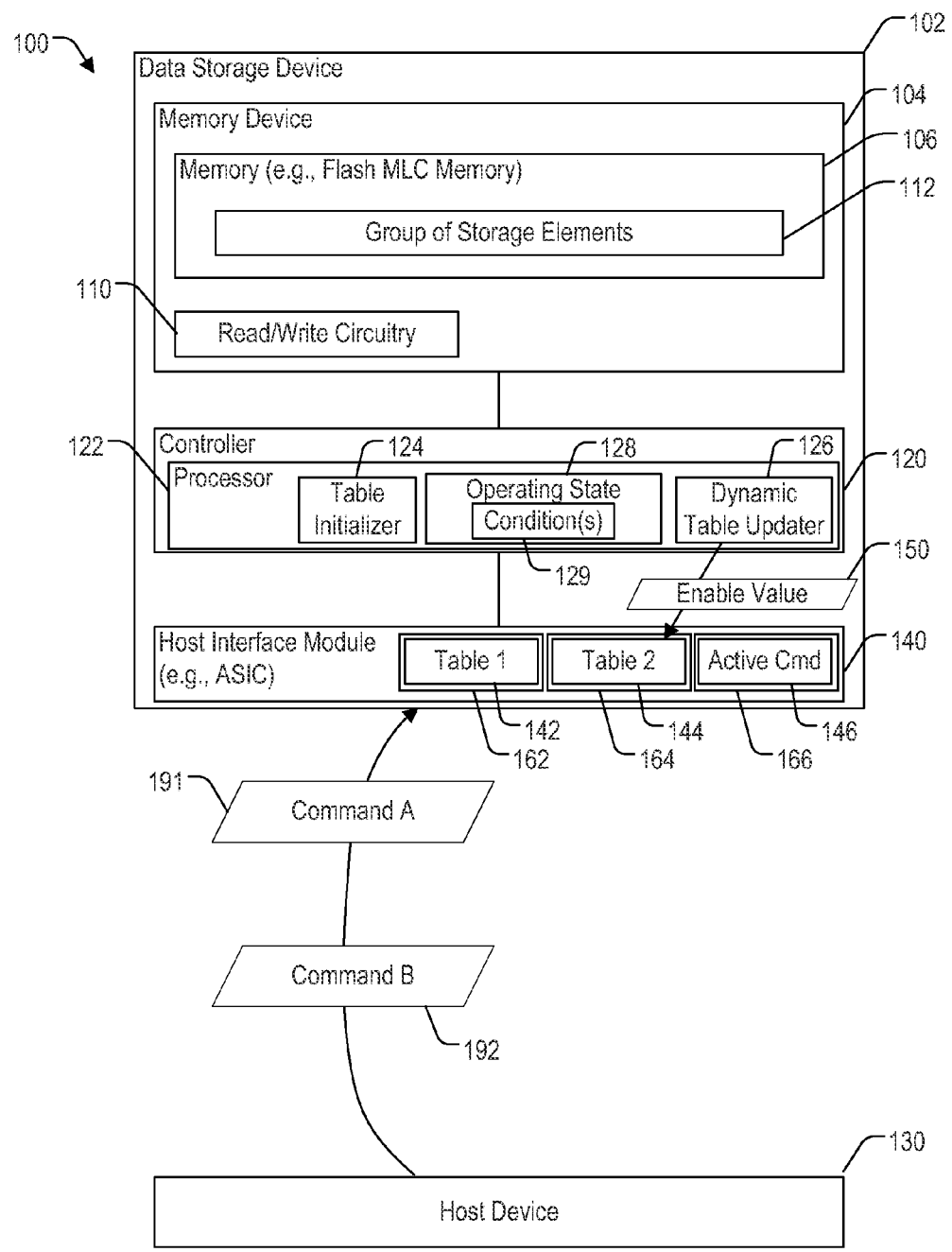
FIG. 1 is a block diagram of a particular illustrative embodiment of a system including a data storage device configured to accept or reject received commands.

Referring to FIG. 1, a particular embodiment of a system 100 includes a data storage device 102 coupled to a host device 130. The data storage device 102 is configured to apply decision logic to accept or reject commands received from the host device 130. The decision logic is implemented by a host interface module 140 using one or more tables 142, 144 that are programmed by a processor 122 of the data storage device 102. Circuitry of the host interface module 140 enables high-speed decision processing, while the programmability of the tables 142, 144 enables flexibility and dynamic adjustment of decision processing based on changing conditions at the data storage device 102.

The host device 130 may be configured to provide data to be stored at the memory 106 or to request data to be read from the memory 106. The host device 130 may include a mobile telephone, a music player, a video player, a gaming console, an electronic book reader, a personal digital assistant (PDA), a computer, such as a laptop computer or notebook computer, any other electronic device, or any combination thereof. The host device 130 communicates via the host interface module 140 to enable reading from the memory 106 and writing to the memory 106. For example, the host device 130 may operate in compliance with a Joint Electron Devices Engineering Council (JEDEC) industry specification, such as a Universal Flash Storage (UFS) Host Controller Interface specification. As other examples, the host device 130 may operate in compliance with one or more other specifications, such as a Secure Digital (SD) Host Controller specification as an illustrative example. The host device 130 may communicate with the memory device 104 in accordance with any other suitable communication protocol.

The data storage device 102 includes the memory device 104, the controller 120, and the host interface module 140. The memory device 104 includes a memory 106, such as a flash multi-level cell (MLC) memory. In some implementations, the memory 106 may be a "two-dimensional" (2D) memory that has a planar configuration. In some implementations, the memory 106 may be a "three-dimensional" (3D) memory that has a 3D configuration, such as a 3D NAND flash memory or a vertical bit line (VBL) resistive random access memory (ReRAM), as illustrative, non-limiting examples. The memory 106 includes a representative group of storage elements 112. For example, the group of storage elements 112 may correspond to flash MLC cells coupled to a word line. For example, the data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 130 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The host interface module 140 may be implemented as circuitry, such as an application specific integrated circuit (ASIC). The host interface module 140 includes a first table 142, a second table 144, and an indication of an active command (active command indicator 146). The first table 142 may include data stored in first data storage circuitry 162, such as latches, one or more registers, a content-addressable memory (CAM) circuit, other data storage circuitry, or a combination thereof. The second table 144 may include data stored in second data storage circuitry 164, such as latches, one or more registers, a content-addressable memory (CAM) circuit, other data storage circuitry, or a combination thereof. The active command indicator 146 may include data stored in third data storage circuitry 166, such as latches, one or more registers, a content-addressable memory (CAM) circuit, other data storage circuitry, or a combination thereof. The host interface module 140 includes circuitry to access and perform logical operations on contents of the data storage circuitry 162-166, such as to read, write, copy, and perform comparisons in response to receiving commands from the host device 130.

The first table 142 includes a first set of entries. Each entry in the first table 142 corresponds to a command that may be active at the data storage device 102. For each command that may be active, the first table 142 includes an indication of non-allowed commands. For example, when an identifier of the active command (such as indicated by the active command indicator 146) matches a command identifier of an entry of the first table 142, one or more other commands that are restricted and not allowed to be performed while the active command is ongoing may be indicated in the entry of the table 142. An example of the first table 142 is described in further detail with respect to FIG. 2.

During operation, the host device 130 may send command A 191 to the data storage device 102, followed by command B 192. The host interface module 140, upon receiving command A 191, may determine that the active command indicator 146 indicates that no command is currently active at the data storage device 102. In response, the host interface module 140 may bypass accessing the first table 142 and may access the second table 144 to determine whether one or more conditions prohibit execution of command A 191. In response to determining that no conditions corresponding to rules in the second table 144 prohibit execution of command A 191, the host interface module 140 may send an indication of command A 191 to the controller 120 for scheduling and further processing.

To illustrate, the host device 130 may send a command, illustrated as command A 191. The host interface module 140 may evaluate that command A 191 is accepted, such as by determining that the active command indicator 146 indicates that no commands are currently active and by determining that no rules in the second table 144 prohibit acceptance of command A, as described further with respect to FIG. 2. The host interface module 140 may forward command A 191 to the controller 120 and may indicate that command A 191 is the active command by setting a value of the active command indicator 146. While processing of the command A 191 is ongoing, the host device 130 may send command B 192. Upon receiving command B 192, the host interface module 140 may access the active command indicator 146 and compare the active command indicator 146 to the command identifiers of one or more entries of the first table 142. Upon locating an entry in the first table 142 that corresponds to command A 191 (i.e., the active command), the host interface module 140 may determine whether command B 192 is indicated as an allowed or non-allowed command to determine whether command B 192 is allowed to be processed while command A 191 is the active command.

The host device 130 may receive a message from the data storage device 102 indicating that command be 192 is rejected. In an example implementation, the host interface module 140 sends a message to the controller 120 indicating rejection of command B 192, and the controller 120 generates a message (e.g., based on protocol rules) to be sent to the host device 130. The message generated by the controller 120 indicates that command B 192 is not currently allowed to be executed.

Also in response to receiving command B 192, the host interface module 140 may access the second table 144 to determine whether command B 192 is allowed to be executed based on one or more rules corresponding to a second set of entries of the second table 144. To illustrate, the first table 142 may include entries corresponding to commands and potential conflicts between commands, and the second table 144 may include entries corresponding to one or more rules associated with conditions of the data storage device 102. Entries of the first table 142 and the second table 144 may be set according to commands that are conditionally allowed or disallowed based on, for example, a memory device standard, such as a UFS standard. Each entry in the second table 144 may be associated with a particular condition and may include an indication of non-allowed commands corresponding to the particular condition. The second table 144 may be dynamically updated by the processor 122. For example, in response to one or more conditions 129 changing based on an operating state 128 of the processor 122, one or more rules of the second table 144 may be selectively enabled or disabled by the processor 122. The processor 122 may also be configured to add additional entries to the second table 144, such as in response to one or more new conditions arising that do not correspond to any of the rules enumerated in the second table 144.

The operating state 128 may refer to one or more aspects of an overall state of the data storage device 102. For example, the operating state 128 may correspond to one or more power modes (e.g., an active mode, a pre-active mode, a sleep mode, an idle mode, a pre-power down mode, a power down mode, etc.), a state where background operations are pending (e.g., having a status of "non-critical," "performance being impacted," or "critical"), a dynamic capacity state, a read state, a write state, a cache implemented/not implemented state, etc. The operating state 128 may be indicated via one or more flags and/or one or more attributes, such as described in a UFS-type standard, such as JEDEC Standard JESD220B, as an illustrative, non-limiting example. The active command, as indicated by the active command indicator 146, may also be included in the operating state 128.

The condition 129 may include an indicator of the operating state 128, such as an indication of a power mode or other state, and may be indicated via one or more flags or attributes. For example, the condition 129 may correspond to one or more of: "unit attention," "background ops—status critical," "UFS sleep," "power down," initialization phase: read descriptor," "initialization phase: read boot," or "initialization phase: app layer," as illustrative, non-limiting examples.

In some implementations, a number of table lookup operations performed by the host interface module 140 may be reduced by accessing the tables 142, 144 sequentially and selectively bypassing accessing the second table 144 based on results of accessing the first table 142. The host interface module 140 may be configured to access the first table 142 to determine whether a command is to be allowed or not allowed based on the active command indicator 146. In response to determining, via accessing the first table 142, that a command is not allowed, access to the second table 144 may be bypassed (i.e., the command is not allowed irrespective of the result of accessing the second table 144). In response to determining that the command is allowed by the first table 142, the host interface 140 may access the second table 144 to determine whether one or more other conditions prohibit performance of the received command.

Other implementations may alter the timing of accessing the first table 142 and the second table 144. As an example, the host interface module 140 may access the first table 142 and the second table 144 substantially concurrently, e.g., in parallel. Performing concurrent lookup operations at the first table 142 and the second table 144 for each received command may reduce latency as compared to sequentially accessing the tables 142, 144.

The processor 122 may be configured to include a table initializer 124 and to track an operating state 128 of the data storage device 102. For example, the operating state 128 may correspond to one or more conditions 129. The conditions 129 may be identified as having an impact on whether or not one or more commands that may be received from the host device 130 are allowed to be performed. The processor 122 may include a dynamic table updater 126 configured to update one or more entries in the second table 144 in response to a change in the one or more conditions 129. For example, the dynamic table updater 126 may be configured to enable or disable one or more entries in the second table 144, such as by providing an enable value 150 to be written into a rule enable indicator field of one or more entries of the second table 144. A particular implementation of the second table 144 is described in further detail with respect to FIG. 2.

The table initializer 124 may be configured to initialize entries in the first table 142, entries in the second table 144, or a combination thereof. For example, the table initializer 124 may be configured to read stored table data, such as from a read-only memory (ROM) accessible to the controller 120 or from one or more other memories. For example, the table initializer 124 may read table data that is retrieved from the memory device 104. The table initializer 124 may be configured to load table entries and data into the respective tables 142, 144, providing increased flexibility as compared to implementations in which command allowance/rejection logic is hard-coded within circuitry of the host interface module 140.

When command B 192 is received, the host interface module 140 accesses the active command indicator 146 (storing an indicator of command A 191) and determines that command A 191 is the currently active command. Host interface module 140 may access the first table 142 to locate an entry in the first table 142 having a command identifier that matches an identifier of command A 191 (i.e., that matches the active command). Upon locating an entry in the first table 142 that has a command identifier that matches the active command (command A 191), the host interface module 149 may determine whether the entry indicates that command B 192 is a non-allowed command. In response to determining that command B 192 is identified as a non-allowed command in the first table 142, the host interface module 140 may reject command B 192, such as by sending a rejection message to the controller 120.

The host interface module 140 may also access the second table 144 to determine whether one or more enabled entries indicate that command B 192 is a non-allowed command based on the condition 129 of the data storage device 102. For example, the host interface module 140 may access the second table 144 concurrently with accessing the first table 142, or in response to determining that the first table 142 indicates that command B 192 is allowed. In response to determining that one or more entries of the second table 144 are enabled and indicates that command B 192 is a non-allowed command, the host interface module 140 may reject command B 192. Otherwise, in response to the first table 142 and the second table 144 indicating that command B 192 is not a non-allowed command, the host interface module 140 may send an indication of command B 192 (e.g., forward command B 192) to the controller 120 for processing.

By determining whether commands received from the host device 130 are to be allowed or not allowed based on accessing the first table 142 and the second table 144, a hardware (e.g., ASIC) implementation of the host interface module 140 may enable command acceptance/rejection decision processing with low latency. Because the tables 142, 144 may be initialized by the table initializer 124, content of the tables 142, 144 may be updated, such as in response to changes to one or more communications standards that may be supported by the data storage device 102 and/or by the host device 130. Thus, functionality provided by the entries of the first table 142, entries of the second table 144, or a combination thereof, may be updated over the life of the data storage device 102, providing increased flexibility. By enabling the processor 122 to dynamically update one or more rules applied by the second table 144, the host interface module 140 can selectively allow or reject commands based on dynamically changing conditions at the data storage device 102.

Although FIG. 1 illustrates the host interface module 140 as distinct from the controller 120, in other implementations the host interface module 140 may be part of the controller 120 (e.g., the host interface module 140 and the processor 122 may be implemented on a single die). Although two tables 142, 144 are illustrated as being used by the host interface module 140, in other implementations a single table may be used, or more than two tables may be used. For example, an implementation where the host interface module 140 further includes a command index table is described with respect to FIG. 2.

Figure 2:
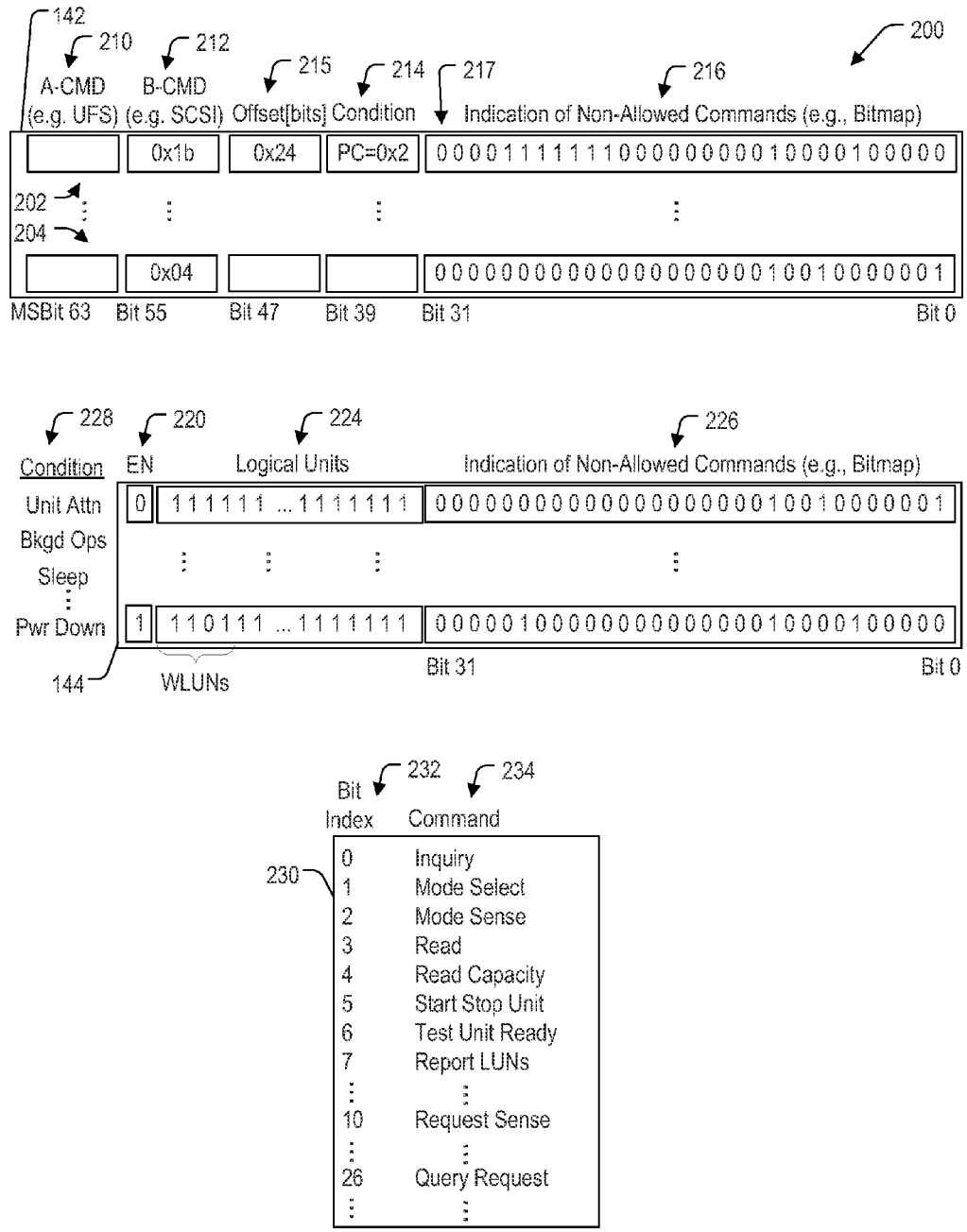
FIG. 2 is a diagram illustrating a particular embodiment of tables that may be accessed by the host interface module of FIG. 1.

Referring to FIG. 2, a particular embodiment 200 of the first table 142 and the second table 144 is depicted. The first table 142 is illustrated as including a first set of entries 202-204. A first representative entry 202 is illustrated as including a first command field 210, a second command field 212, a condition field 214, a command header offset field 215, and an indication of non-allowed commands 216, such as a bitmap indicating, for a set of commands, whether each command is allowed or not allowed. For example, a particular bit 217 may indicate whether the indication of non-allowed commands 216 is applicable per logical unit or for the entire device. Each entry 202-204 in the first table 142 includes a command identifier, which may include a value in the first command field 210 or in the second command field 212. For example, the command identifiers may include one or more identifiers of system interface commands in the second command field 212. To illustrate, system interface commands may be small computer system interface (SCSI) commands. Alternatively, a command identifier in one or more of the entries 202-204 may include one or more indicators of memory device commands, such as an indicator of a universal flash storage (UFS) command in the first command field 210. A command identifier may be a data word (e.g., a byte) indicating an identifier of the command, such as a hexadecimal value representing an opcode, as illustrated in FIG. 2.

The condition field 214 may be configured to store data indicating one or more conditions that are to be satisfied in order for the indication of non-allowed commands 216 to be applied. For example, the first entry 202 corresponds to a system interface command identified as a command with a hexadecimal value of "1b" (e.g., a start stop unit command), and a value in the condition field 214 indicates that a value in a power condition (PC) field, indicated in the command header offset field 215 set to bit '0x24', equals to "2" (e.g., "PC=0x2", transitioning to a pre-sleep mode). Other entries in the first table 142 may include an entry with a system interface command of "1b" and condition field 214 on offset 215 '0x24' indicating "PC=0x1" (e.g., transitioning to a pre-active mode), and an entry with a system interface command of "1b" and condition field 214 on offset 215 '0x24' indicating "PC=0x3" (e.g., transitioning to a pre-power down mode). Because three entries in the first table 142 may match the active command indicator 146, the condition field 214 may be used to select which entry (if any) is to be applied.

The indication of non-allowed commands 216 is illustrated as including a bitmap with a dedicated bit for each command of several enumerated commands. As illustrated, the bitmap has 31 bits, indexed from bit 0 to bit 30, and bit 31 (indicated as the particular bit 217) indicates if the 'rule' is for entire device or for specific logical unit. A command index table 230 may be included in the host interface module 140 and accessed in conjunction with the first table 142. The command index table 230 indicates, for each value of a bit index 232, a command 234 that corresponds to the bit index 232. For example, a bit index of 0 corresponds to an "inquiry" command. In response to a bit having the 0 bit index in the indication of non-allowed commands 216 for the active command having a "1" value, the inquiry command may be determined to be an allowed command. Alternatively, in response to the bit in the bit index having a "0" value, the inquiry command may be determined to be a non-allowed command. As another example, the bit having a bit index of 5 corresponds to a "start stop unit" command. When a start stop unit command is received at the host interface module 140, such as when command B 192 is a start stop unit command, the host interface module 140 may access the command index table 230 to locate an entry corresponding to the start stop unit command to identify a bit index 232 for the start stop unit command. For example, the command index table 230 indicates that bit index 5 corresponds to the start stop unit command. The host interface module 140 may read the bit value at bit index 5 in the indicator of non-allowed commands 216 of the particular entry of the first table 142 (associated with the active command) to determine whether the start stop unit command is allowed or non-allowed.

The second table 144 is illustrated as having a second set of entries, with each entry corresponding to a particular condition 228. For example, an entry may correspond to a "unit attention" condition, a "background operations" condition, a "sleep" condition, or a "power down" condition, as illustrative, non-limiting examples. Each entry of the second set of entries in the second table 144 may include a rule enable field 220, a field indicating logical units 224 of the data storage device 102 to which the rule is applied, and a field including an indication of non-allowed commands 226. The indication of non-allowed commands 226 may correspond to the indications of non-allowed commands 216 described with respect to the first table 142 (e.g., a bitmap having values corresponding to "allowed" or "non-allowed" and bit index values corresponding to commands according to the command index table 230).

The rule enable field 220 may include one or more rule enable indicators, such as a 0 value indicating that the rule corresponding to a particular entry is disabled, and a 1 value indicating that the rule corresponding to the particular entry is enabled. The logical unit indicator 224 may include a bitmap that provides an indicator each logical unit of the data storage device 102 to indicate whether the particular logical unit is affected by the rule. For example, in a UFS implementation, the memory 106 may be logically partitioned into one or more logical units that may be mapped to bits within the logical unit indicator 224. In a particular example corresponding to a UFS implementation, one or more bits of the logical unit indicator 224 may be dedicated to correspond to well-known logical unit numbers (WLUNs). For example, a well-known logical unit may correspond to a UFS device, a SCSI report, a boot logical unit, and/or a replay protected memory block (RPMB) logical unit.

As described with respect to FIG. 1, the rule enable indicator within the rule enable field 220 may be dynamically set by the processor 122 during operation of the data storage device 102. For example, when one or more of the conditions 129 of FIG. 1 correspond to a condition 228 of a particular entry of the second table 144, the processor 122 may cause the rule enable indicator of the particular entry to be updated. For example, when the operating state 120 causes the condition 129 to become a power down condition (such as when a start stop unit command with PC=3 is received to transition the memory 106 to a pre-power down mode, after which the data storage device 102 may automatically cause the memory 106 to enter a power down mode after completion of a power mode transition), the processor 122 may cause the rule enable field 220 of the entry corresponding to the power down condition 228 to transition from having a 0 value (e.g., a non-enabled value) to having a 1 value (e.g., an enable value). As a result of enabling the entry corresponding to the power down condition, the host interface module 140 may apply command allowance/rejection decisions corresponding to the memory 106 having the power down condition.

Figure 3:
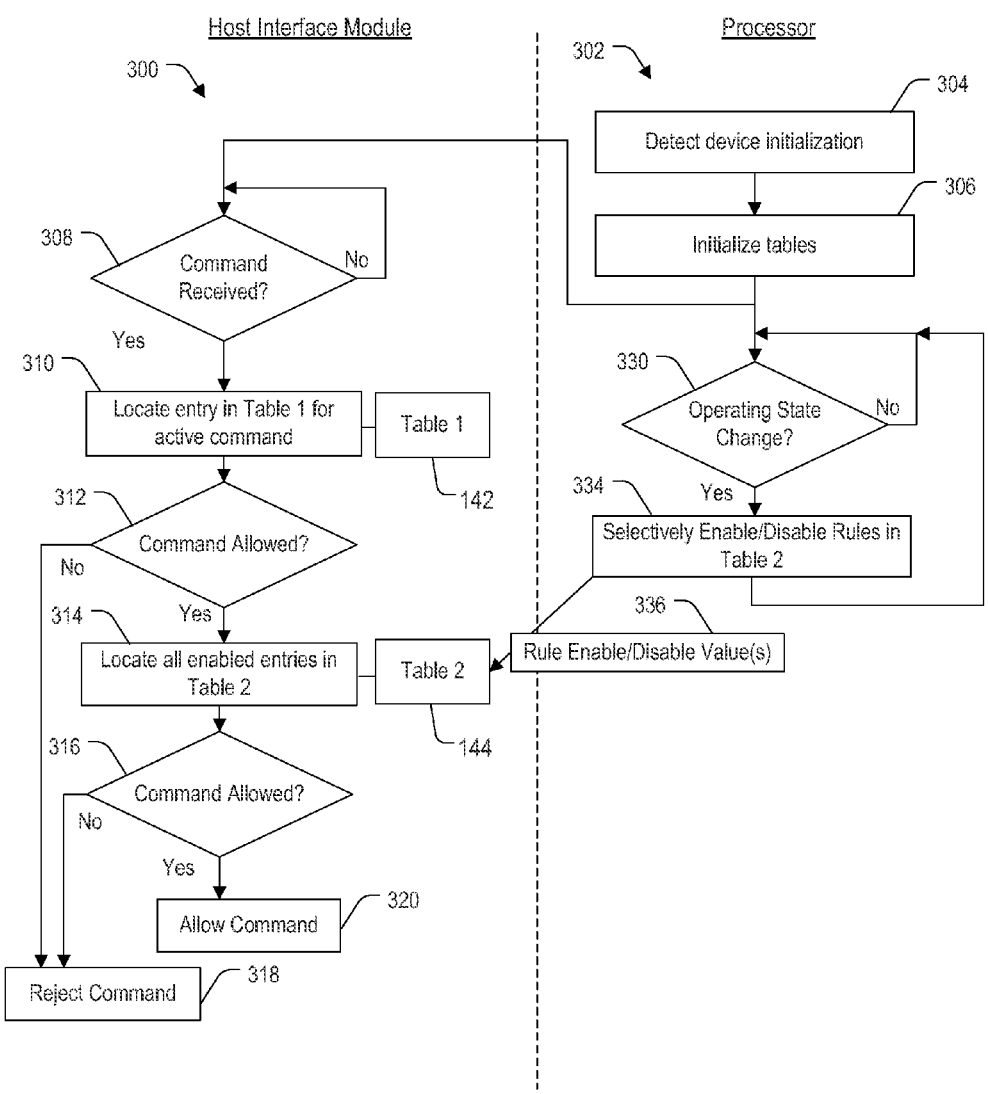
FIG. 3 is a diagram illustrating a particular embodiment of operations that may be performed at the data storage device of FIG. 1.

Referring to FIG. 3, a particular embodiment of a flow chart is depicted illustrating operations at the data storage device 102 of FIG. 1. The flow chart includes acts 300 that may be performed by the host interface module 140, and acts 302 that may be performed by the processor 122 of FIG. 1.

The processor 122 may detect device initialization, at 304. For example, the processor 122 may detect a device power on condition, a device initialization sequence, or one or more other conditions indicating initialization of the data storage device 102. In response to detecting the device initialization, the processor 122 may initialize one or more tables at the host interface module 140. For example, the processor 122 may access the memory device 104 and retrieve data corresponding to the entries of the first table 142, data corresponding to the entries of the second table 144, and/or data corresponding to the command index table 230 of FIG. 2. The processor 122 may provide the data to the host interface module 140 to populate one or more of the first table 142, the second table 144, and the command index table 230 as part of a device initialization procedure. The stored data may be updated at the memory device 104, such as to include updates to comply with one or more protocols or standards supported by the data storage device 102, and the table initializer 124 may provide the updated data to the host interface module 142 during an initialization event following the update.

Once initialized, the host interface module 140 may access the tables 142, 144 to determine whether one or more commands received from the host device 130 are to be allowed. For example, the host interface module 140 may determine, at 308, whether a command has been received from the host device 130. In response to determining that a command has been received, the host interface module 140 may locate an entry in the first table 142 corresponding to the active command, at 310. For example, the host interface module 140 of FIG. 1 may access the active command indicator 146 to determine an identifier of the currently active command. The host interface module 140 may search the first set of entries in the first table 142 of FIG. 2 to determine whether a command identifier matching the active command is found in the first command field 212 or in the second command field 214 of any entry of the first table 142.

In response to locating an entry in the first table 142 that corresponds to the active command, the host interface module 140 may determine whether the received command is allowed, at 312. For example, in the implementation illustrated in FIG. 2, the host interface module 140 may query the command index table 230 to locate a bit index corresponding to the received command and may determine whether the bit at the bit index in the indication of non-allowed commands 216 of the located entry in the first table 142 has an "allowed" value (e.g., "1") or a "non-allowed" value (e.g., "0"). In response to determining that the located entry has the non-allowed value for the received command, the host interface module 140 rejects the command, at 318.

The host interface module 140 may locate enabled entries in the second table, at 314. For example, the host interface module 140 may access the rule enable field 220 of each entry in the second table 144 and may locate entries having an "enabled" value (e.g., "1") in the rule enable field 220. For each of the enabled entries, the host interface module 140 may determine whether any of the located entries indicates the received command as a non-allowed command. In response to determining that none of the located entries indicates the received command as a non-allowed command, at 316, the host interface module 140 may allow the command, at 320. Otherwise, in response to determining that one or more of the located entries indicates that the command is not allowed, the host interface module 140 rejects the command, at 318.

As received commands are processed at the data storage device 102, the processor 122 may determine, at 330, that an operating state has changed, such as the operating state 128 of FIG. 1. In response to detecting that the operating state has changed, the processor 122 may selectively enable or disable one or more rules in the second table 144, at 334. For example, in response to determining that one or more of the conditions 129 have changed, the processor 122 may send one or more rule enable values or rule disable values 336 to the host interface module 140 to overwrite values in identified entries in the second table 144. To illustrate, when an operation state change occurs (e.g., a pre-power down condition of the memory 106 ends and a power down condition of the memory 106 begins), the processor 122 may send a rule disable value (e.g., "0") to be written into the rule enable field of the table entry corresponding to the pre-power down condition, and may send a rule enable value (e.g., "1") to be written into the rule enable field of the table entry corresponding to the power down condition. By enabling rules that correspond to an operating state of the data storage device 102 and disabling rules that do not correspond to the operating state, accurate command allowance/rejection decisions may be made by the host interface module 140.

By determining whether commands received from the host device 130 are to be allowed or not allowed based on the first table 142 and the second table 144, a hardware (e.g., ASIC) implementation of the host interface module 140 may enable command allowance/rejection decision processing with low latency. Because the tables 142, 144 may be programmed by the processor 122, such as by the table initializer 124 and the dynamic table updater 126, content of the tables 142, 144 may be updated in response to changes to one or more communications standards that may be supported by the data storage device 102 and/or by the host device 130 and/or based on dynamically changing conditions at the data storage device 102.

Figure 4:
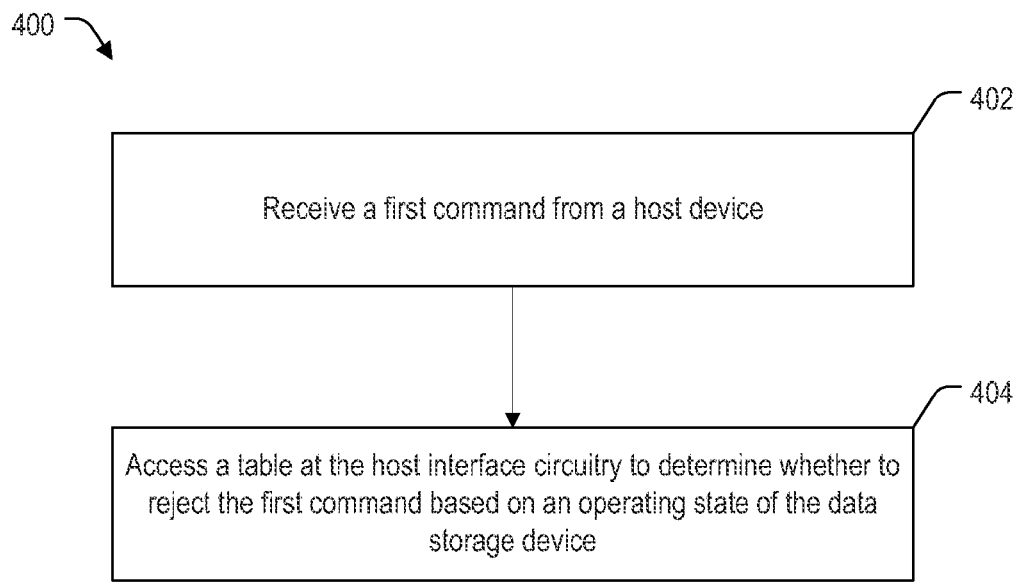
FIG. 4 is a flow chart of a particular illustrative embodiment of a method of determining whether to reject a command received by the data storage device of FIG. 1.

Referring to FIG. 4, a flow chart of a method 400 that may be performed in a data storage device that includes host interface circuitry, a processor coupled to the host interface circuitry, and a non-volatile memory is depicted. For example, the method 400 may be performed at the data storage device 102 of FIG. 1.

A first command is received from a host device, at 402. For example, the first command may be command B 192 that is received from the host device 130 of FIG. 1. The first command may be received at the host interface circuitry, such as the host interface module 140 of FIG. 1.

A table at the host interface circuitry is accessed to determine whether to reject the first command based on an operating state of the data storage device, at 404. The table is programmable by the processor. For example, the table may include data stored in one or more registers of the host interface circuitry. To illustrate, the host interface module 140 may access the first table 142 and/or the second table 144 to determine whether command B 192 is to be rejected based on the active command indicator 146 and/or based on one or more rules in the second table 144 that are selectively updated based on the condition(s) 129.

In some implementations, the table includes a first table that includes a first set of entries, such as the first table 142. Each entry of the first set of entries may include a command identifier (e.g., an entry in the command field 210 or 212 of FIG. 2) and an indication of non-allowed commands corresponding to the command identifier (e.g., one or more values in the indication of non-allowed commands 216 of FIG. 2). For example, the command identifiers may include one or more identifiers of system interface commands, one or more indicators of memory device commands, or a combination thereof. To illustrate, the one or more memory device commands may be universal flash storage (UFS) commands as defined by a UFS standard that functions as a wrapper protocol for small computer system interface (SCSI) commands as defined by a SCSI standard.

The host interface circuitry may maintain an indication of an active command, such as the active command indication 146 of FIG. 1. In response to receiving the first command, the host interface circuitry may determine whether the indication of the active command matches a command identifier of any of the entries of the first table. For example, the host interface circuitry 140 may compare the active command indicator 146 to values in each of the command fields 212, 214 of each entry 202-204 of the first table 142 until a matching value is found or until a determination is made that none of the entries 202-204 includes a value in a command field 212, 214 that matches the active command indicator 146.

In response to determining that the indication of the active command matches the command identifier of an entry of the first table, the host interface circuitry may determine whether the first command matches any of the non-allowed commands of the entry. For example, the host interface module 140 may search the command index table 230 to locate a bit index corresponding to command B 192, and may determine whether the bit value at the located bit index in the indication of non-allowed commands 216 (e.g., the bitmask illustrated in FIG. 2) of the entry indicates an allowed command (e.g., a "1" value) or a non-allowed command (e.g., a "0" value). As another example, the host interface circuitry may determine whether the first command matches any of the non-allowed commands of the entry in response to determining that the indication of the active command matches the command identifier of an entry of the first table 142 and also determining that a condition field of the entry (e.g., the condition field 214) indicates a condition (e.g., the condition 129, such as a value of a power condition field of a received command) that is satisfied.

The table may include a second table, such as the second table 144, that includes a second set of entries. Each entry of the second set of entries may correspond to a particular rule and may include a rule enable indicator (e.g., the rule enable indicator 220 of FIG. 2) and an indication of non-allowed commands corresponding to the particular rule (e.g., the indication of non-allowed commands 226 of FIG. 2). The processor may dynamically set a value of the rule enable indicator of one or more of the entries in response to a change of the operating state altering an applicability of one or more rules. For example, when a background operations status flag is set to a value of "critical", an entry in the second table 144 corresponding to "background ops—status critical" may be enabled and may indicate that only "mode select" and "mode sense" commands are to be allowed. After the background operations status field is set to another value (e.g., after completing one or more background operations), the entry in the second table 144 corresponding to "background ops—status critical" may be disabled. The host interface circuitry may be configured to compare the first command to the indication of non-allowed commands for entries of the second table that have the rule enable indicator matching an enable value. For example, when a bit index of the first command (e.g., bit index 5 for a start stop unit command) is determined by accessing the command index table 230 of FIG. 2, the host interface module 140 may perform a logical AND operation of the bit having bit index 5 from each indication 226 that corresponds to an enabled rule in the second table 144.

By determining whether commands received from the host device 130 are to be allowed or not allowed based on the first table 142 and the second table 144, a hardware (e.g., ASIC) implementation of the host interface module 140 may enable command acceptance/rejection decision processing with low latency. Because the tables 142, 144 may be programmed by the processor 122, such as by the table initializer 124 and the dynamic table updater 126, content of the tables 142, 144 may be updated in response to changes to one or more communications standards that may be supported by the data storage device 102 and/or by the host device 130 and/or based on dynamically changing conditions at the data storage device 102.

Although various components depicted herein are illustrated as block components and described in general terms, such components may include one or more microprocessors, state machines, or other circuits configured to enable the controller 120 of FIG. 1 to initialize and/or update data at the tables 142, 144 and to track the operating state 128. For example, the table initializer 124 and the dynamic table updater 126 may represent physical components, such as hardware controllers, state machines, logic circuits, or other structures, to enable initialization and/or updating of data at the tables 142, 144.

Functions described with respect to the controller 120 may be implemented using a microprocessor or microcontroller programmed to initialize and/or update one or more of the tables 142, 144. For example, the controller 120 may detect a voltage level at a power-on indicator, in response to detecting the voltage level, retrieve table data from the non-volatile memory 104, and transfer the data to the host interface module 140, such as via a direct memory access (DMA) operation. In a particular embodiment, the controller 120 includes the processor 122 that executes instructions that are stored at the non-volatile memory 104. Alternatively, or in addition, executable instructions that are executed by the processor 122 may be stored at a separate memory that is not part of the non-volatile memory 104, such as at a read-only memory (ROM).

The data storage device 102 may include one or more semiconductor memory devices. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the scope of the disclosure as described herein and as understood by one of skill in the art.

In a particular embodiment, the data storage device 102 may be implemented in a portable device configured to be selectively coupled to one or more external devices. However, in other embodiments, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular embodiment, the data storage device 102 may include a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in a data storage device that includes host interface circuitry, a processor coupled to the host interface circuitry, and a non-volatile memory, performing:
receiving a first command from a host device;
determining that an active command indicator indicates processing of an active command at the data storage device; and
accessing a first table at the host interface circuitry to determine whether to reject the first command based on determining whether one or more non-allowed commands associated with the active command include the first command, wherein the first table is programmable by the processor.

2. The method of claim 1, wherein:
the first table includes a first set of entries; and
each entry of the first set of entries includes: a command identifier, and an indication of at least one non-allowed command corresponding to the command identifier.

3. The method of claim 1, further comprising, in response to receiving the first command, determining whether the active command indicator matches a command identifier of an entry of the first table.

4. The method of claim 3, further comprising, in response to determining that the active command indicator matches the command identifier of the entry of the first table, determining whether the one or more non-allowed commands include the first command based on a value of a bit of a bit map of the entry, a bit index of the bit associated with the first command.

5. The method of claim 3, further comprising, in response to determining that the active command indicator matches the command identifier of the entry of the first table and determining that a condition field of the entry indicates a condition that is satisfied, determining whether the one or more non-allowed commands include the first command, the entry including an indication of the one or more non-allowed commands.

6. The method of claim 1, further comprising selectively accessing a second table at the host interface circuitry to determine whether to reject the first command based on whether one or more second non-allowed commands associated with a condition of the data storage device include the first command, the second table accessed in response to determining that the first command is not included in the one or more non-allowed commands.

7. The method of claim 6, wherein:
the second table includes a second set of entries; and
each entry of the second set of entries corresponds to a particular rule and includes: a rule enable indicator, and an indication of at least one non-allowed command.

8. The method of claim 7, further comprising updating one or more rule enable indicators of one or more of the second set of entries in response to a change of the condition.

9. The method of claim 6, wherein the one or more second non-allowed commands are indicated by at least one entry of the second table that has a rule enable indicator matching an enable value.

10. A data storage device comprising:
a non-volatile memory;
host interface circuitry configured to receive a command from a host device and to determine whether to reject the command based on:
whether a data entry indicates the command is associated with an active command and non-allowed, and
a table associated with an operating state of the data storage device, the operating state including at least one of a power mode of the data storage device, a status of a pending background operation, a dynamic capacity state, or a cache implementation state; and
a processor coupled to the non-volatile memory and to the host interface circuitry, wherein the processor is configured to program the table.

11. The data storage device of claim 10, wherein the table includes data stored in one or more registers of the host interface circuitry.

12. The data storage device of claim 10, wherein:
the host interface circuitry is configured, in response to receiving the command, to access a first table to determine whether to reject the command based on processing of an active command at the data storage device;
the first table includes a first set of entries; and
each entry of the first set of entries includes: a command identifier, and an indication of non-allowed commands corresponding to the command identifier.

13. The data storage device of claim 12, wherein the host interface circuitry is further configured to:
maintain an indication of the active command; and
in response to receiving the command, determine whether the indication of the active command matches a particular command identifier of an entry of the first table.

14. The data storage device of claim 13, wherein the host interface circuitry is further configured, in response to determining that the indication of the active command matches the particular command identifier of the entry of the first table, to determine whether the command matches a non-allowed command of the entry.

15. The data storage device of claim 13, wherein the host interface circuitry is further configured, in response to determining that the indication of the active command matches the particular command identifier of the entry of the first table and determining that a condition field of the entry indicates a condition that is satisfied, to determine whether the command matches a non-allowed command of the entry.

16. The data storage device of claim 10, wherein:
the table includes a second set of entries; and
each entry of the second set of entries corresponds to a particular rule and includes: a rule enable indicator, and an indication of non-allowed commands.

17. The data storage device of claim 16, wherein the processor is further configured to set a value of the rule enable indicator of one or more of the entries in response to a change in the at least one of the power mode of the data storage device, the status of the pending background operation, the dynamic capacity state, or the cache implementation state.

18. The data storage device of claim 16, wherein the host interface circuitry is further configured to compare the command to the indication of non-allowed commands for entries of the table that have an enable value of the rule enable indicator.

19. A data storage device comprising:
a non-volatile memory;
a host interface module configured to selectively allow or reject a command from a host device based on whether data stored at the host interface module indicates the command as associated with an active command and non-allowed and based on an operating state of the data storage device, the operating state including at least one of a power mode of the data storage device, a status of a pending background operation, a dynamic capacity state, or a cache implementation state; and a processor coupled to the non-volatile memory and to the host interface module, wherein the processor is configured to send the data to the host interface module.

20. The data storage device of claim 19, wherein the host interface module includes a register that stores the data as a table.

21. The data storage device of claim 19, wherein the host interface module is further configured to reject the command in response to determining, based on the data, that the command matches a non-allowed command indicated as associated with an enabled rule.

22. The data storage device of claim 19, wherein the host interface module is further configured to reject the command in response to determining, based on the data, that the command matches a non-allowed command indicated as associated with an active command.

23. The data storage device of claim 19, wherein the non-volatile memory is monolithically formed in one or more physical levels of arrays of memory cells having an active area above a silicon substrate, and further comprising circuitry associated with operation of the memory cells.

24. A data storage device comprising:
   means for processing information;
   means for providing an interface to a host device, the means for providing coupled to the means for processing and configured to receive a first command from the host device;
   means for determining that an active command indicator indicates processing of an active command at the data storage device; and
   means for accessing a table at the means for providing to determine whether to reject the first command based on whether one or more non-allowed commands associated with the active command include the first command, wherein the table is programmable by the means for processing.

25. The data storage device of claim 24, wherein: the table includes a first set of entries; and each entry of the first set of entries includes:
   a command identifier, and
   an indication of at least one non-allowed command corresponding to the command identifier.

* * * * *